United States Patent [19]
Lee

[11] Patent Number: 5,546,775
[45] Date of Patent: Aug. 20, 1996

[54] LOCKING DEVICE FOR THE AUTOMATIC SHIFT LEVER OF A CAR

[76] Inventor: Chi-Yuan Lee, Back Building, No. 740–7, Chung-Cheng Rd., Hsin-Chuang; Taipei, Taiwan

[21] Appl. No.: 374,300

[22] Filed: Jan. 18, 1995

[51] Int. Cl.⁶ .................................................. F16H 57/00
[52] U.S. Cl. .................................................. 70/201; 70/195
[58] Field of Search .............................. 70/195, 201, 202, 70/203, 145–148; 74/538

[56] References Cited

U.S. PATENT DOCUMENTS

| | | | |
|---|---|---|---|
| 3,431,755 | 3/1969 | Eisenman | 70/181 |
| 3,583,184 | 6/1971 | Papale | 70/193 |
| 4,078,447 | 3/1978 | Kato | 74/475 |
| 4,365,522 | 12/1982 | Kubota | 74/475 |
| 4,532,824 | 8/1985 | Lamy | 74/538 |
| 4,619,122 | 10/1986 | Simpson | 70/34 |
| 4,747,278 | 5/1988 | Roncelli | 70/201 |
| 4,774,850 | 10/1988 | Shovlin | 74/538 |
| 4,938,042 | 7/1990 | Muramatsu | 70/247 |
| 5,081,856 | 1/1992 | Hsu | 70/247 |
| 5,329,792 | 7/1994 | Lee | 70/201 |
| 5,428,977 | 7/1995 | Knape | 70/247 |

*Primary Examiner*—Steven N. Meyers
*Assistant Examiner*—Gary Estremsky
*Attorney, Agent, or Firm*—Bacon & Thomas

[57] ABSTRACT

A locking device for an automatic shift lever in a car is embedded in a shift knob by providing a receiving hole on the lateral side of the knob for the shift lever to receive a lever lock. A stop piece is provided on one end of the lever lock to lock a push button to prevent the shift lever from shifting.

8 Claims, 12 Drawing Sheets

(PRIOR ART)

5,546,775

LOCKING DEVICE FOR THE AUTOMATIC SHIFT LEVER OF A CAR

BACKGROUND OF THE INVENTION

1. Field of the Invention

The present invention relates to a locking device for the automatic shift lever of a car which can lock, in an easy way, a control link in a knob for the shift lever, such that the shift lever is unable to operate such that a theft-proof effect can be achieved.

2. Description of the Prior Art

Theft-proof devices for automobiles in the market are divided into three kinds, theft-proof bells, steering wheel locks, and shift lever locks, the principles and disadvantages of each being as follows:

1) a theft-proof bell uses a balancing principle to allow the switch of a buzzer to be turned on for scaring a thief; however, if a passenger inadvertently touches the car body, or even when vibrating is effected by a car passing by, the bell will make a loud noise which can affect the quiet and peaceful moods of people. The theft-proof bell is powered by the battery of the car, so that the car is subjected to electricity losses even when parking.

2) a steering wheel lock provides a lock head in the middle of a bar, it can be placed on the surface of the steering wheel, with the two ends of the bar abutting against both sides thereof, so as to limit the steering wheel from rotating; or an extendible hooking bar can be used to lock the steering wheel by locking of the lock head with one end of the bar hooking the steering wheel and the other end hooking the pedal of the accelerator and having the length therebetween adjustable. However, this is bothersome in use and some drivers hate to use the steering wheel lock as it adds too much time to parking, while theft of a car often happens in a short time.

3) a shift lever lock provides a lock head at one side of the seat for the shift lever (referring to FIG. 10), with a pivotally connecting hole on the lock head facing the shift lever and engaged by a U-shaped locking hook to lock the shift lever and thus prevent the same from moving. However, when the lock is opened or closed, a driver must turn his body to insert a key into the lock hole with one hand, and to draw away or engage the lock head from/with the U-shaped locking hook with another hand. This is a quite unconvenient task to perform with two hands in a narrow space in a car.

In view of the above-stated disadvantages of conventional theft-proof car locks, the inventor of the present invention has heretofore developed a delicate lock structure which causes a stop piece on a lever lock to stop a control link, thereby preventing a control button from being pressed down and pushing rearwardly the control link, and therefore in turn to prevent moving of a shift control rod, so that the automatic shift lever cannot be moved. The object of locking can thus be achieved, and with this, any disadvantage or unconvenience in operation and assembling in the conventional U-shaped locking hook and lock head used for locking the shift lever can be eliminated. However, it can be seen from FIG. 10 that when a shift control rod 4' is pressed down in a normal shifting action, a limiting rod 41" extending sidewardly on the bottom end thereof will move downwardly to be free from engagement in a guiding groove 51' on a guiding plate 5', so that the shift lever 6' can be moved forwardly and backwardly freely, i.e., so long as the limiting rod 41' is free from engagement in the guiding groove 51', the shift lever 6' can be moved; in other words, if a thief is familiar with the way of locking of the invention and the principle of operation of the automatic shift lever, he can then use an iron sheet to insert into the gap between the shift lever 6' and the seat 61' for the shift lever 6', to twist and press the same, as long as it presses the limiting rod 41' to move down the shift control rod 4', the shift lever 6' can be shifted. In this way, the lock structure will be of no use. The way to open it is not so easy for a thief to know, because he must know well the manner of locking as well as the structure of the car, nevertheless, this is a concern and warrants that the lock structure for the automatic shift lever of the car has to be redesigned.

SUMMARY OF THE INVENTION

The inventor of the present invention hence provided the locking device for the automatic shift lever of a car of the present invention after continual study and designing based on his practical experience of professional selling and production in automobile theft-proof locks for years, particularly, the present invention resides in a locking measure wherein a push button cannot be pressed down due to the interaction of a lever lock with an engaging structure in which a control link and a shift control rod engage with each other so that the push button is locked. Yet prying of the seat for the shift lever by a thief to press the shift control rod directly at one side of the seat can be prevented.

The main object of the present invention is to provide a lock device for the automatic shift lever of a car, wherein beside the characteristic that the push button is locked and cannot be pressed down, the engaging and limiting structure with the control link of the shift control rod is added, such that the shift control rod cannot be moved except through normal operation of the push button, so that a thief will have no chance to override the lock device, thus a 100% theft-proofing effect can be achieved.

The secondary object of the present invention is to provide a lock device for the automatic shift lever of a car which comprises a cylindrical lever lock received in a receiving hole provided on the lateral side of the knob fixed directly by screws on the shift lever without necessity of locking by some other lock.

Another object of the present invention is to provide a lock device for the automatic shift lever of a car, which lock device allows a key to be easily inserted directly in a locking hole both for locking after parking the car and for unlocking.

Additional objects, features and advantages of the present invention will become more readily apparent after reading the detailed description of the preferred embodiments thereof with reference to the accompanying drawings.

BRIEF DESCRIPTION OF THE DRAWINGS

FIG. 9A, is a view showing the relative positions between the protecting sleeve and the seat for the shifting lever;

FIG. $9A_2$ is a top view of the structure of FIG. 9A;

DETAILED DESCRIPTION OF THE PREFERRED EMBODIMENTS

Figure 1:
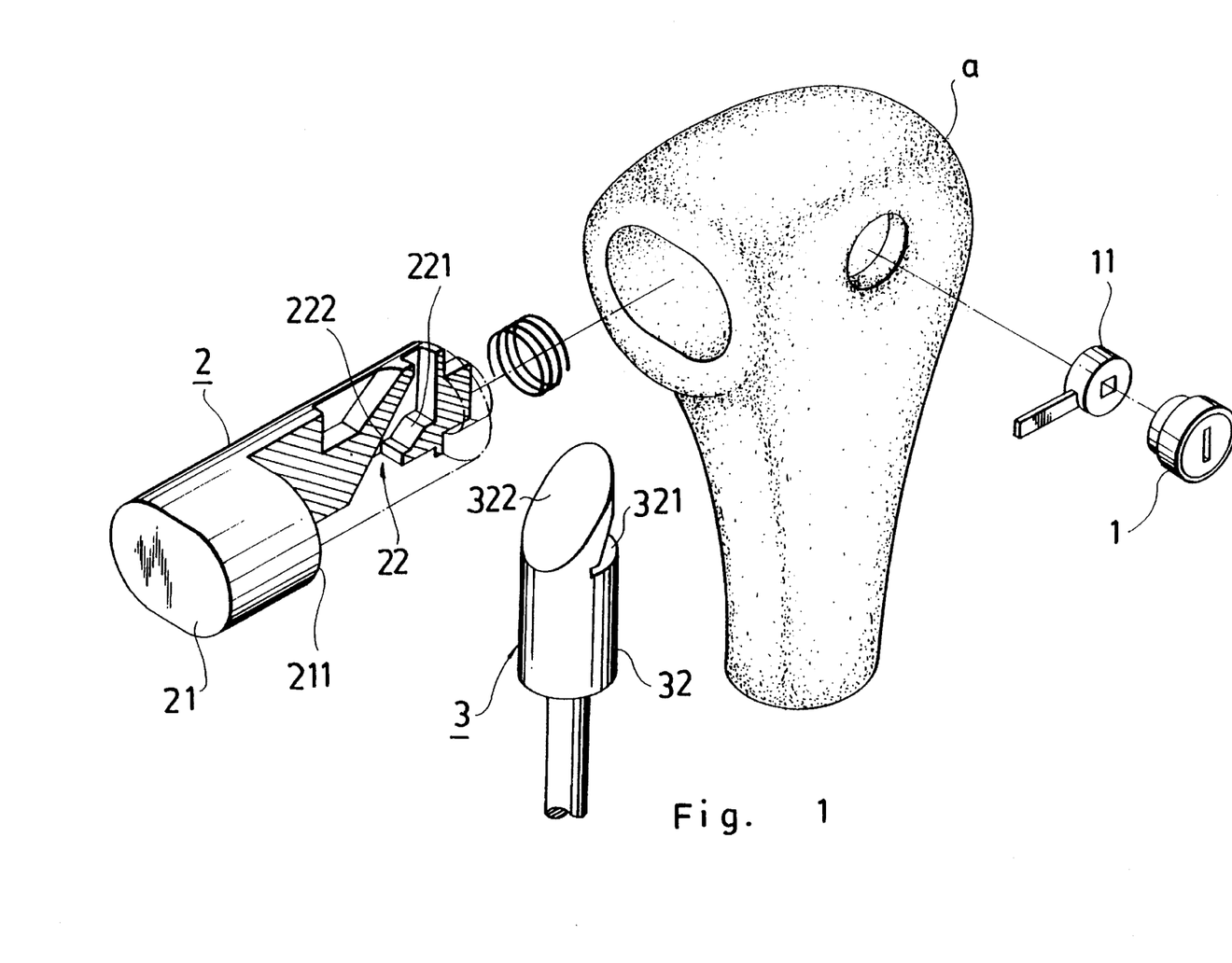
FIG. 1 is an exploded perspective view of a basic embodiment of the present invention.
Figure 1A:
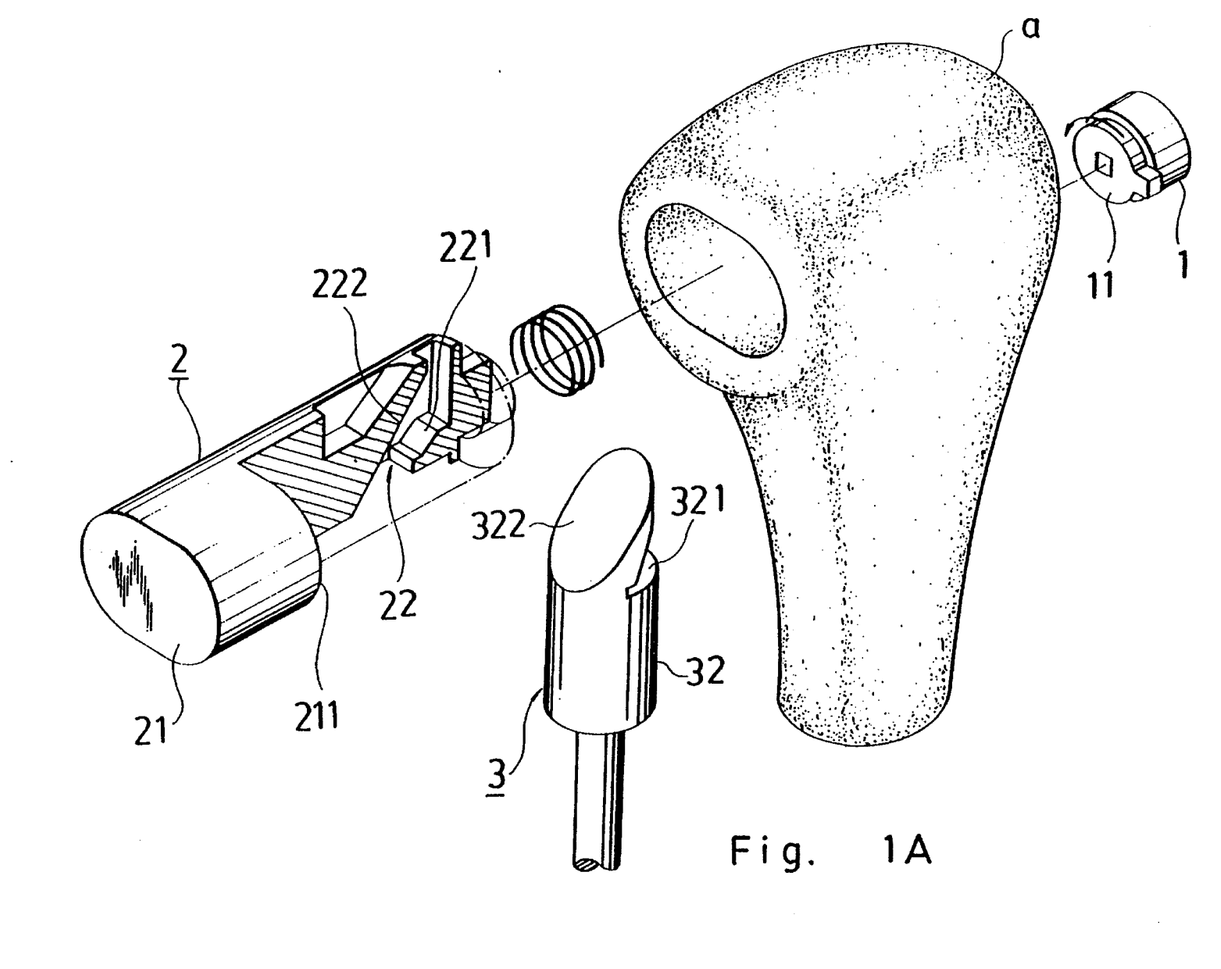
FIG. 1A is an exploded perspective view of another embodiment of the present invention.
Figure 5:
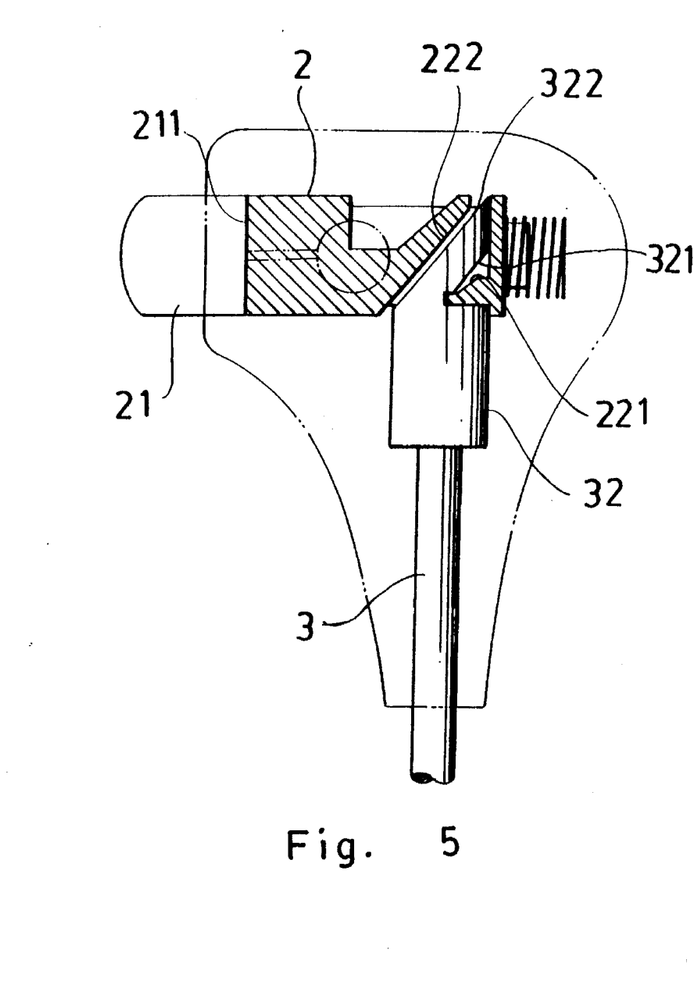
FIG. 5 is a view showing the relative positions of the parts of the present invention when locked.
Figure 5A:
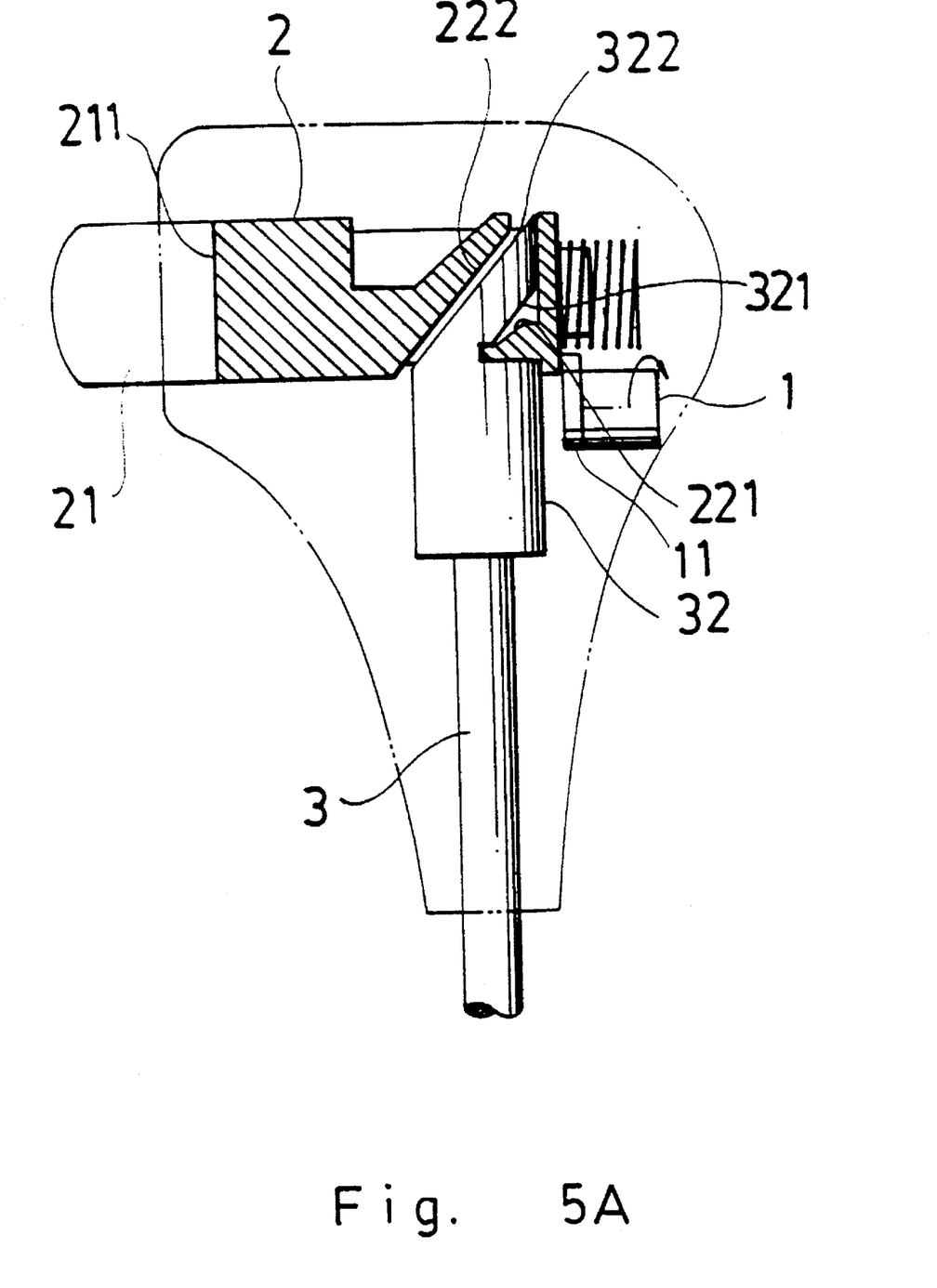
FIG. 5A is a view showing the relative positions of the parts of another embodiment of the present invention when locked.

It can be clearly seen in FIGS. 1 and 1A that the lock device for the automatic shift lever 4 of a car comprises mainly a lever lock 1, a control link 2 and a shift control rod 3 of the shift lever. One end of the lever lock 1 is received in the front or the lateral side of a knob "a" for the shift lever and engages a stop piece 11. The front end of the control link 2 protrudes from the lateral side of the knob "a" and forms a push button 21. The external diameter of the push button 21 is larger than the thickness of the remainder of the control link 2 itself, thus a protruding portion 211 is formed. When the push button 21 is used to manually move the control link 2, the shift control rod 3 will be moved downwardly to complete the preparing motion for lever shifting. When a shift is completed, the push button 21 can be released to restore the control link 2 and the shift control rod 3 to their original states. Rotation of the lever lock 1 and the stop piece 11 causes the stop piece 11 to abut the protruding portion 211 at the end of the push button 21 or abut against the end of the control link 2 (as shown in FIG. 5 and FIG. 5A) to prevent the push button 21 from being pressed down, thereby creating a locking state.

Figure 2:
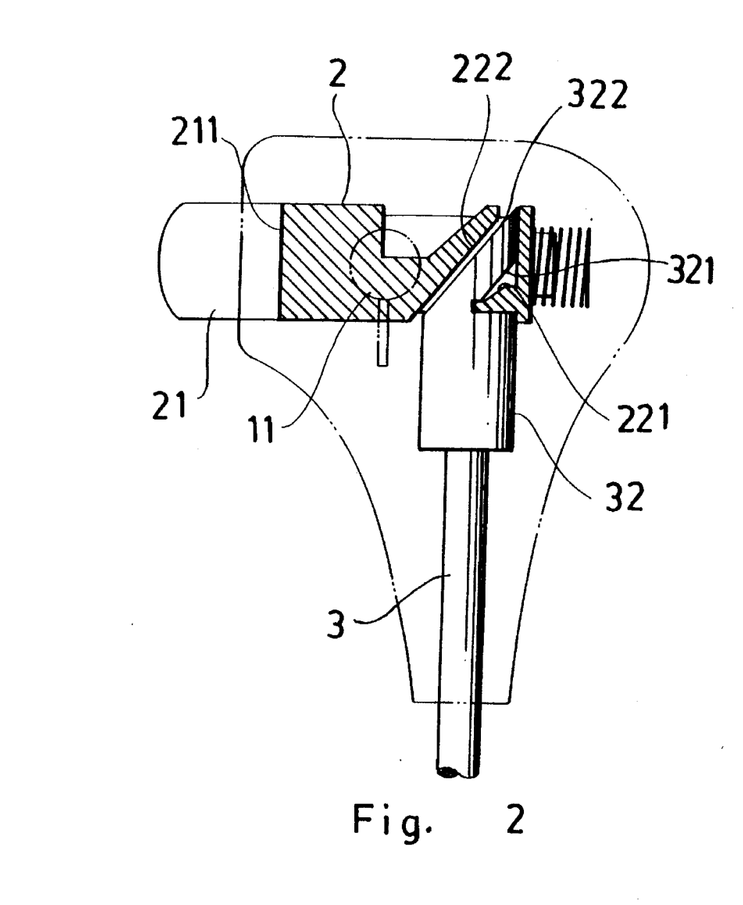
FIG. 2 is a view showing the relative positions of the parts of the present invention before locking.
Figure 3:
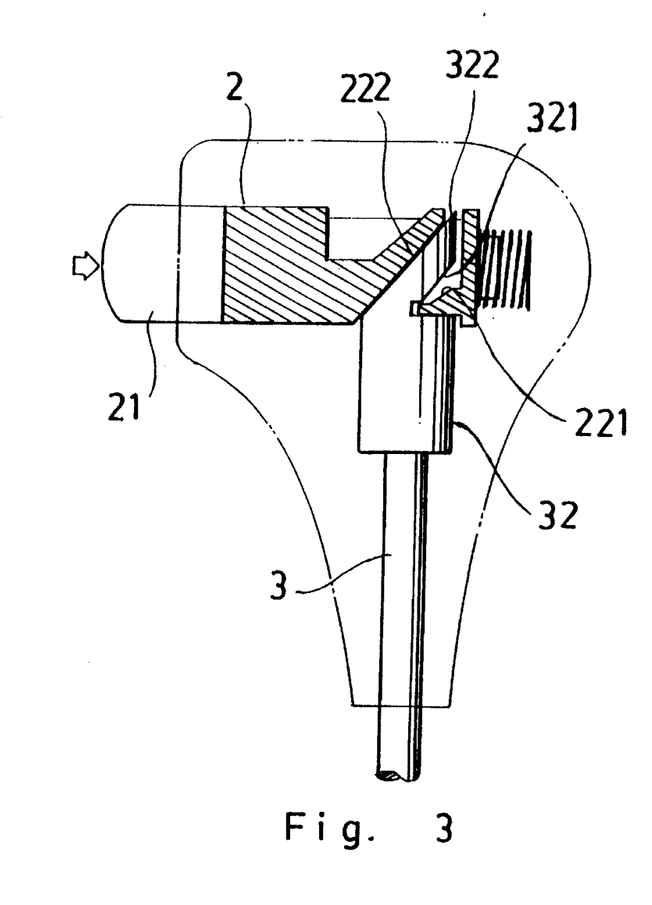
FIG. 3 is a schematic view showing the first situation in the normal operation of shifting in accordance with the present invention.
Figure 4:
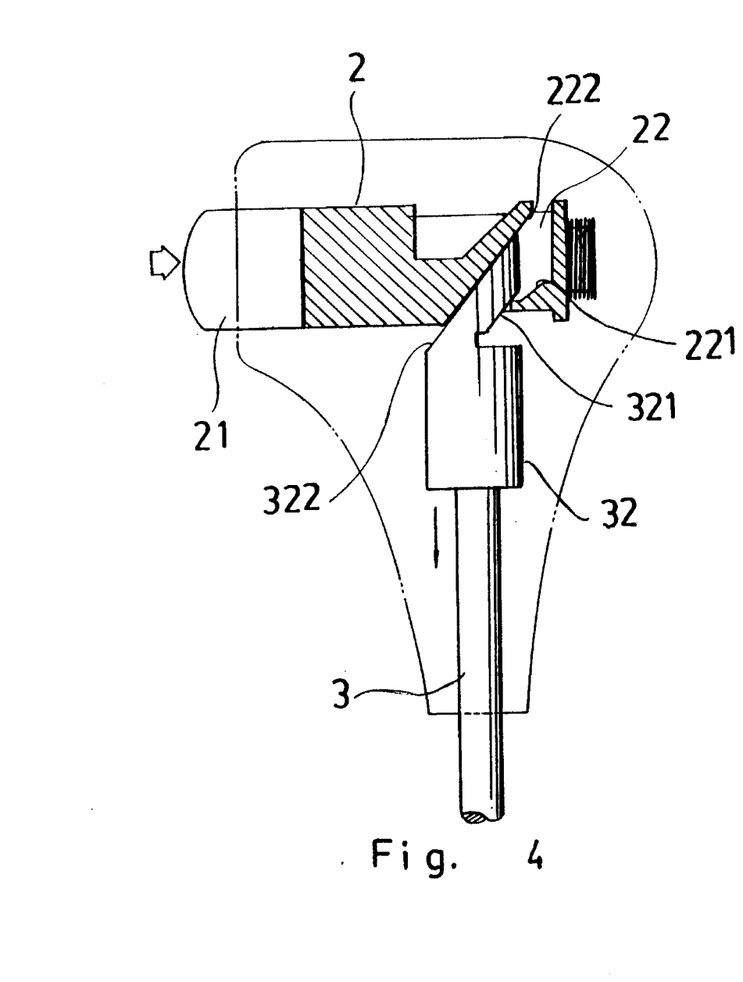
FIG. 4 is a schematic view showing the second situation in the normal operation of shifting in accordance with the present invention.

Besides the above-mentioned principle of operation and objects of inventiveness, the present invention further provides a limiting structure which includes a groove 22 and a sliding block 32 which enable a mutual movement between the control link 2 and the shift control rod 3. The main feature thereof resides in a bevelling surface 222 and a ladder like fixing member 221 on the groove 22, and on the sliding block 32, there is a bevelling surface 322 corresponding to the bevelling surface 222 and a limiting groove 321 corresponding to the fixing member 221. In an initial state where the control link 2 is not moving, the sliding block 32 is received in the groove 22 (referring to FIG. 2), while the fixing member 221 is engaged in the limiting groove 321. Between the bevelling surfaces 222 and 322 of the sliding block 32 and the groove 22 respectively, there is a gap. At this time, the shift control rod 3 extending down from the bottom of the sliding block 32 is in an engaged and limited state by engaging between the fixing member 221 and the limiting groove 321, and cannot be pressed down. When the push button 21 moves the control link 2 as shown in FIG. 3, the gap between the bevelling surfaces 222 and 322 of the sliding block 32 and the groove 22 will be eliminated. Meantime, the engaging state between the fixing member 221 and the limiting groove 321 will be relieved. In this way, when the control link 2 moves back (referring to FIG. 4), the groove 22 will move the sliding block 32 down to complete the preparing motion for lever shifting, and when a shifting is completed, the control link 2 and the shift control rod 3 will be recalled to their original state wherein they engage each other. Then, by rotation of the lever lock 1 as stated above, the shift lever can be locked again.

It should be readily apparent from the above statement that the control link 2 and the shift control rod 3 have no way to get rid of engagement therebetween and thus relieve the shift lever beside pressing of the push button 21. Therefore, if the push button 21 is prevented from being pressed down by the lever lock 1 and the stop piece 11 (such as shown in FIG. 5), the aim of locking the shift lever can be achieved, and prying or moving the shift control rod 3 downwardly by a thief on one side of the seat for the shift lever with an iron piece or some other tools can be prevented.

Figure 6:
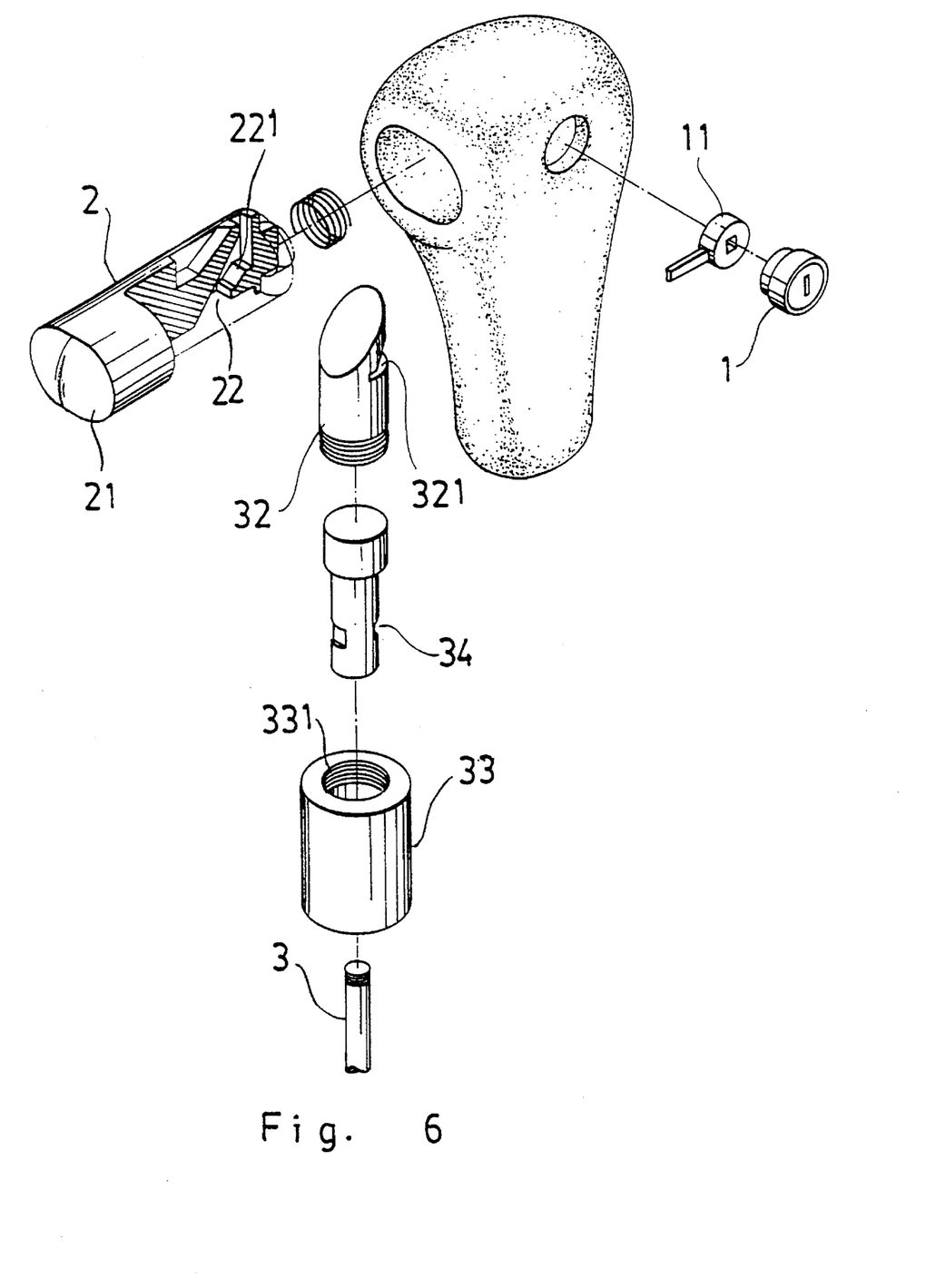
FIG. 6 is a perspective view of the present invention in conjunction with an idle running mechanism.
Figure 7:
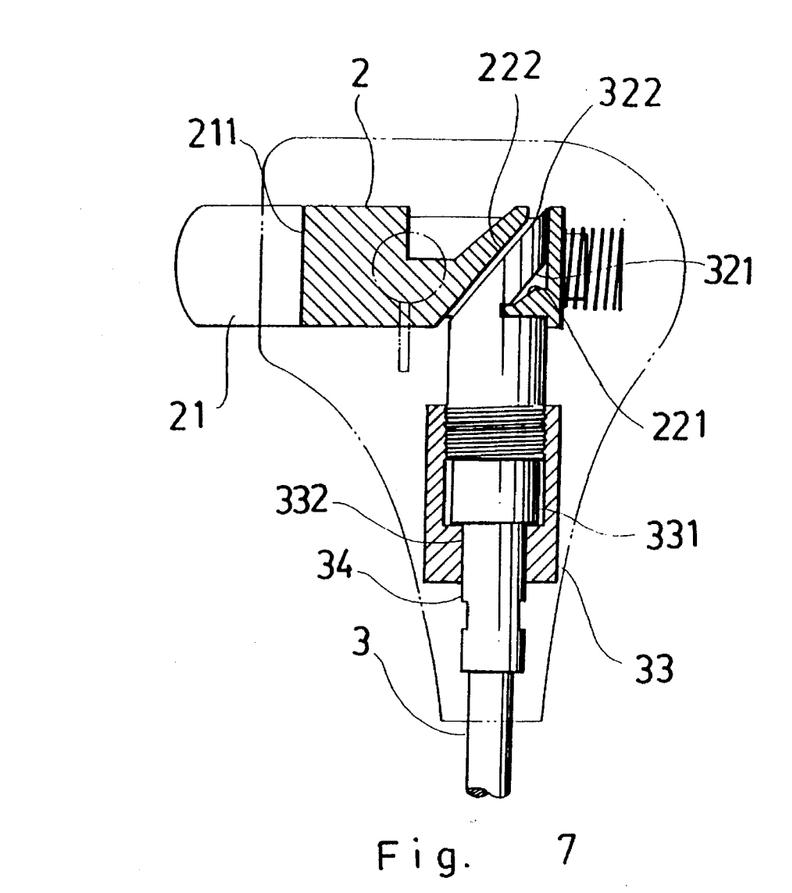
FIG. 7 is a side view showing the relative positions of the parts in the idle running mechanism after assembly.

Further, a mechanism for preventing rotation and destruction can be provided in accordance with the present invention. As shown in FIG. 6, the mechanism is comprised of a sleeve 33 and an axle 34 between the top end of the shift control rod 3 and the sliding block 32, wherein the axle 34 is inserted in an enlarged hole 331 of the sleeve 33 (referring to FIG. 7). The shift control rod 3 is inserted in the central hole 332 of the sleeve 33, while the sliding block 32 is threadedly attached to the top end of the enlarged hole 331 in the sleeve 33. By means of the sleeve 33 and the axle 34, the shift control rod 3 and the sliding block 32 form idle running members. When the shift control rod 3 rotates to rotate the axle 34 in the sleeve 33, the sliding block 32 is not influenced thereby, and when the sliding block 32 rotates to rotate the sleeve 33, the shift control rod 3 is not influenced thereby either, i.e., when either the sliding block 32 or the shift control rod 3 is rotated by an external force, its rotation is not transmitted to the other element, so that a thief will fail if trying to circumvent the locking device by turning the same and therefore a theft-proof effect can be certainly achieved.

Figure 8:
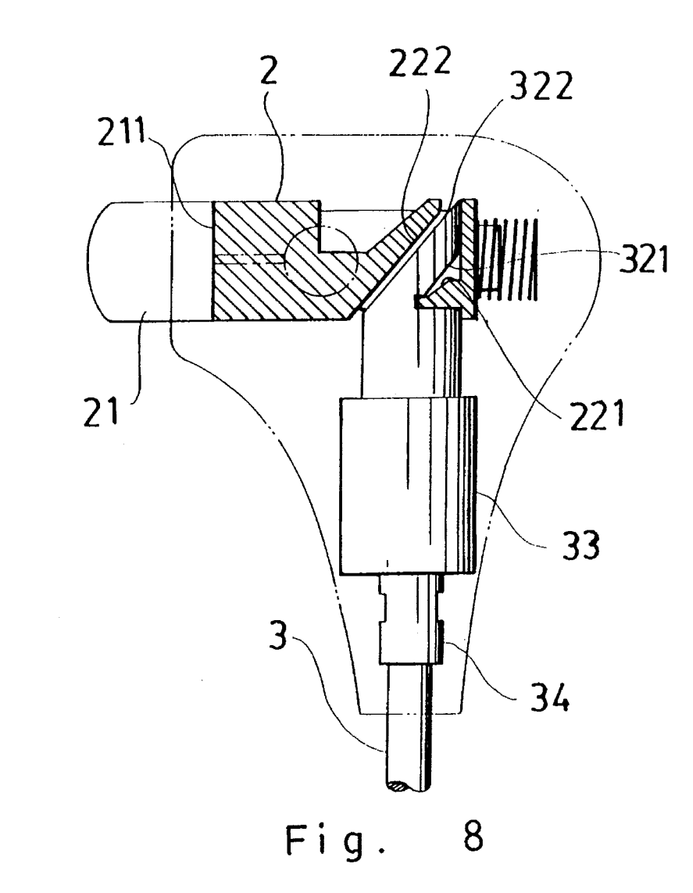
FIG. 8 is another side view showing the relative positions of the parts in the idle running mechanism after assembly.

From the above statement, it is evident that the control link 2 and the shift control rod 3 have truly no way to get rid of engagement therebetween to thus relieve the shift lever without pressing of the push button 21. By preventing the push button 21 from being pressed down through the lever lock 1 and the stop piece 11 (such as shown in FIG. 8), the aim of locking the shift lever can be achieved, and the moving shift control rod 3 downwardly by a thief on one side of the seat for the shift lever with an iron piece or some other tools can be prevented.

Figure 9:
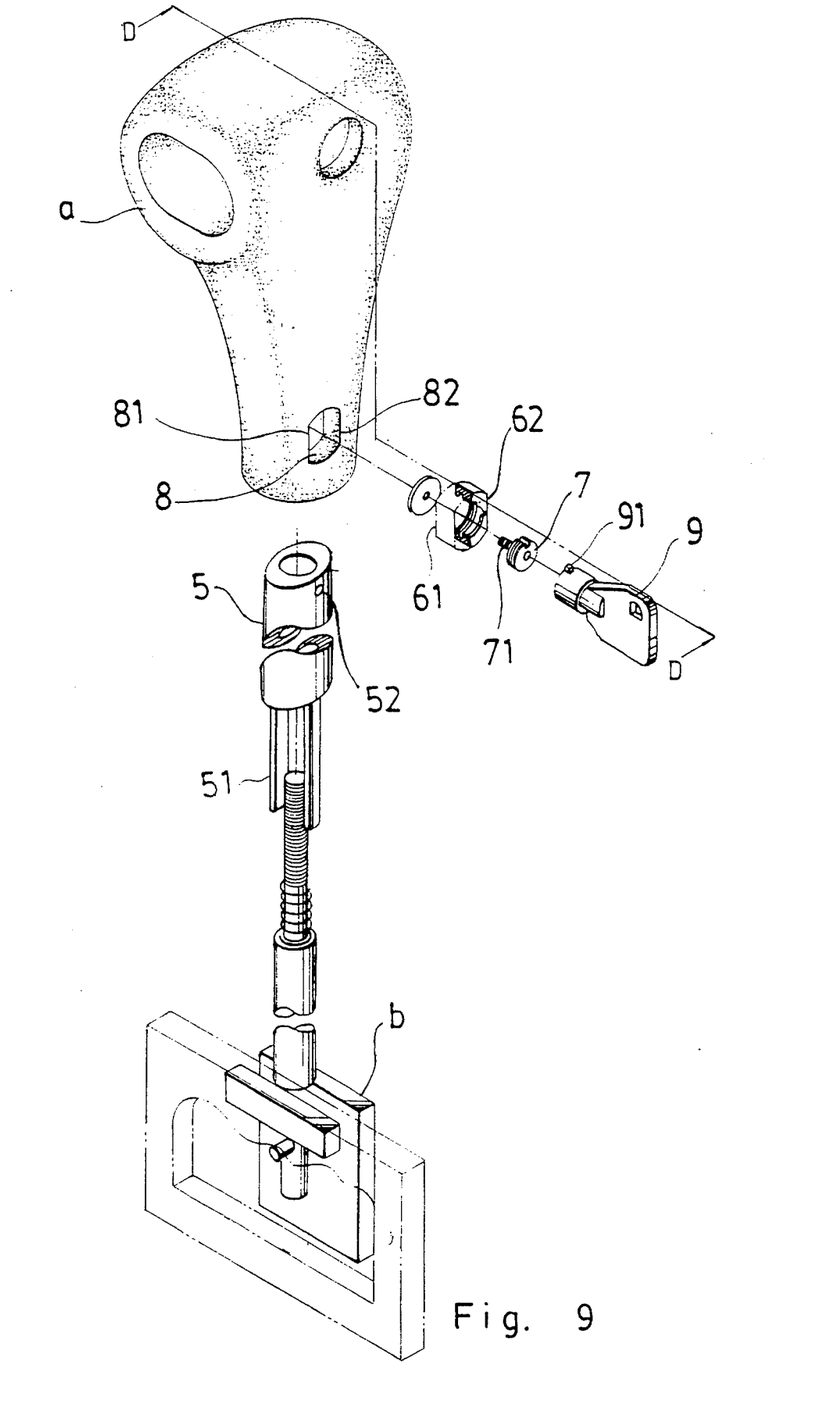
FIG. 9 is an exploded view showing a protecting sleeve and its fixing mechanism in the present invention.
Figure 9A:
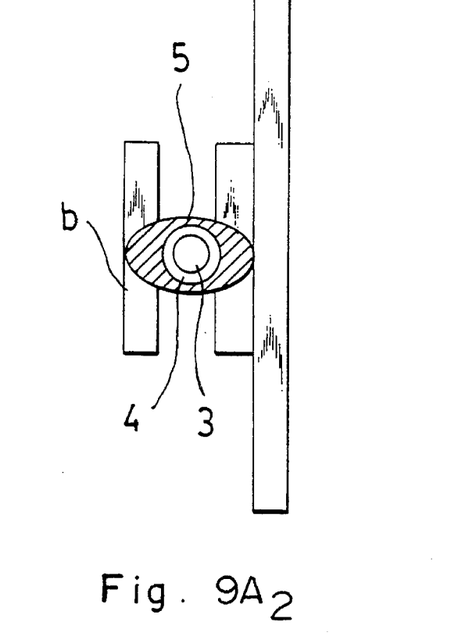
Figure 9A:
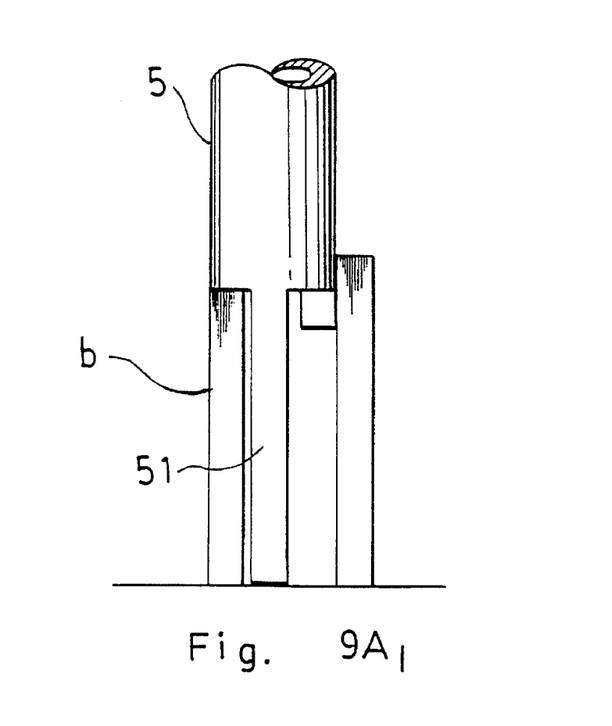
Figure 10:
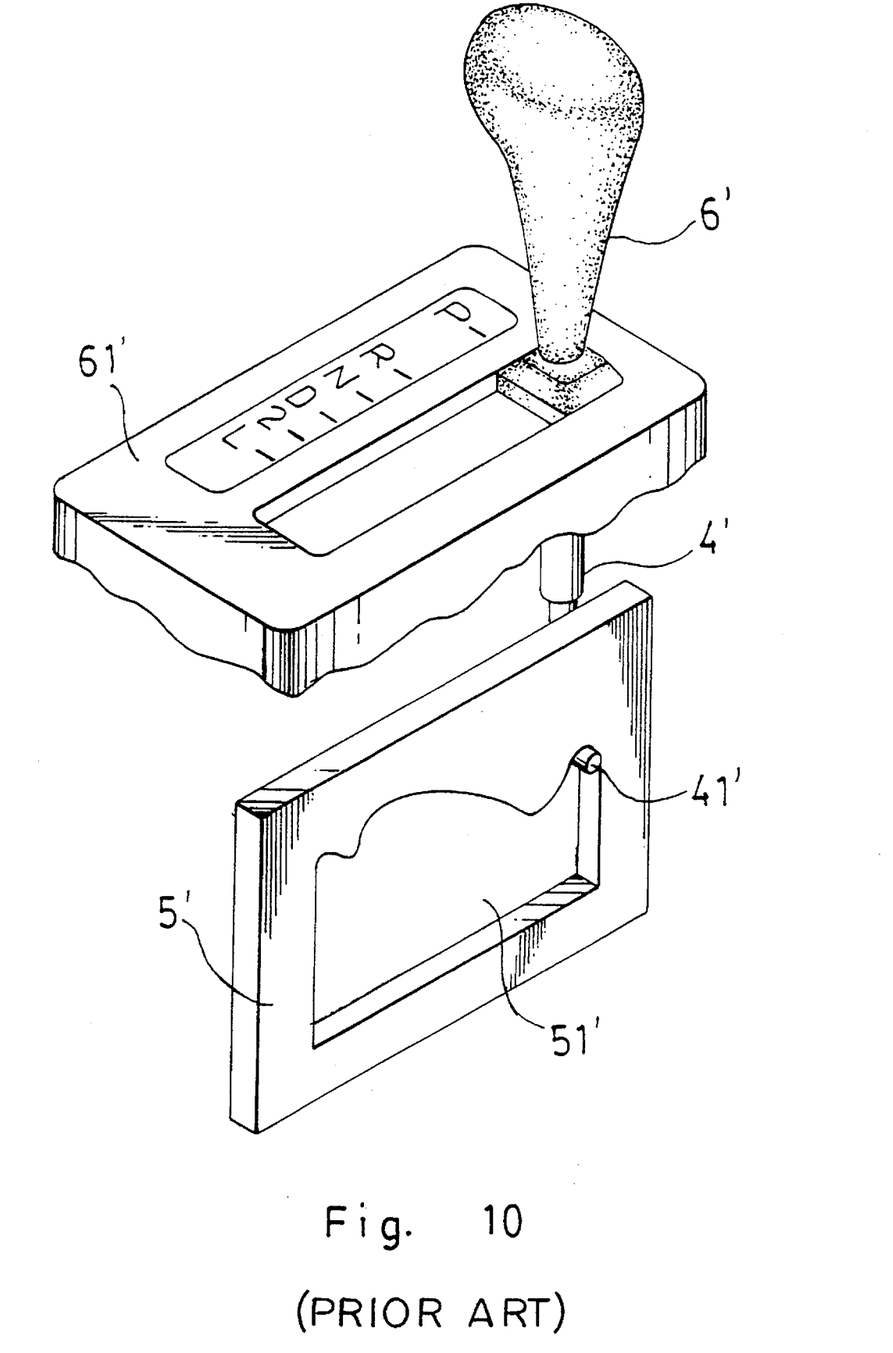
FIG. 10 is a perspective view showing the structure of a conventional automatic shift lever.

The present invention is further confirmed by the following embodiments:

Referring to FIGS. 9 and $9A_2$, a fixing mechanism is added to the lateral side of the knob "a", yet a sleeve 4 on the shift control rod 3 is hooded with a protecting sleeve 5, wherein the protecting sleeve 5 has two limiting rods 51 extending down from the bottom end thereof into a space between a guiding plate, which is conventional as represented by 5' in FIG. 10 showing the structure of a conventional automatic shift lever. A shift lever supporting frame "b" is disposed along side the guiding plate. Even with attempts to reach the bottom of the seat for the shift lever, the protecting sleeve 5 can not be broken even by striking. The diameter of the protecting sleeve 5 is larger than the gap between the guiding plate and the shift lever supporting frame, so that the knob "a" is prevented from rotation (referring to FIG. 9A). The above-mentioned fixing mechanism is comprised of the main body 6 of the lock, a lock latch 7 provided in the main body 6, and a bolt 71 provided at the center of the lock latch 7. There is a fixing screw hole 52 provided in the protecting sleeve 5 and positioned corresponding to the bolt 71. The main body 6 of the lock is located in a limiting hole 8 of the knob "a". In order not to allow the main body 6 to rotate together with the rotation of a key 9 after assembly, the surface of the main body 6 of the lock incorporates several rotation preventing planes which generally define flats similar to those provided on a convention nut. In this way, the main body 6 is located and rotation of the lock body is prevented by the flats (61,62) engaging the lateral sides (81, 82) of the limiting hole 8.

Figure 9B:
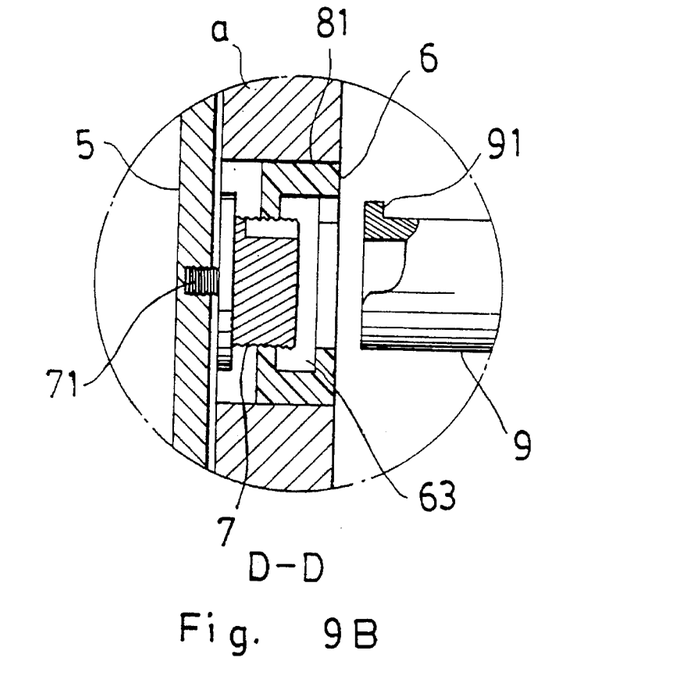
FIG. 9B is a sectional view of the fixing mechanism after assembly and taken from a sectional line D—D in FIG. 9.
Figure 9C:
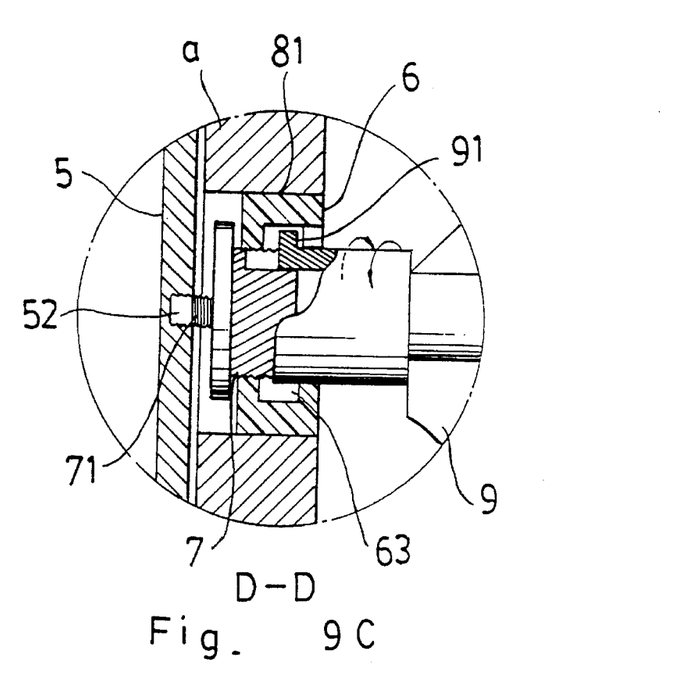
FIG. 9C is a similar sectional view to that of FIG. 9B showing a key dragging a latch to rotate in the fixing mechanism of FIG. 9.
Figure 9D:
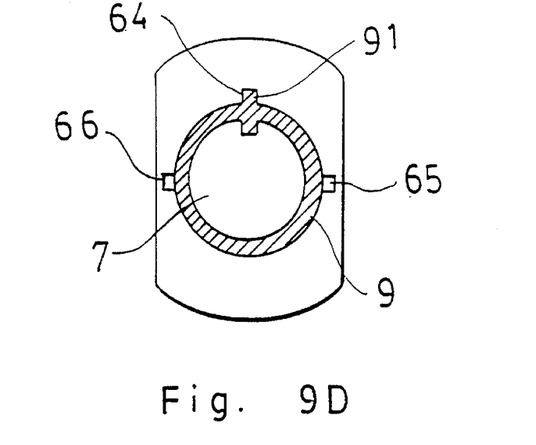
FIG. 9D is a schematic view showing the key being located in alignment with a releasing hole.
Figure 9E:
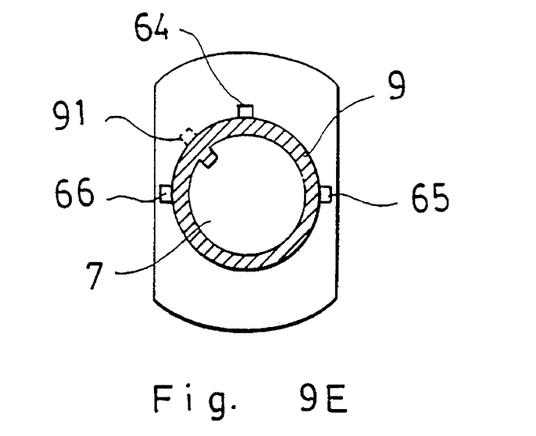
FIG. 9E is a schematic view showing the key overpassing the releasing hole.
Figure 9F:
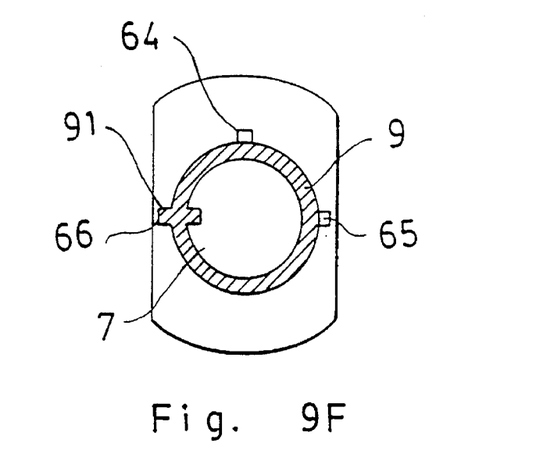
FIG. 9F is a schematic view showing the key being turned back to the releasing hole for being drawn out.

When the key 9 is inserted into a locking hole 63 (as shown in FIG. 9B), the lock latch 7 can be rotated therewith (opening of the lock and checking of the key 9 will not be discussed further herein, because it is not the point of the present invention). The bolt 71 integrally connected with the lock latch 7 will, of course, also rotate, and will be moved forwardly till it contacts the bottom of the fixing screw hole 52 of the protecting sleeve 5 or backwards when unscrewing for repairs along the length of the fixing screw hole 52 (as shown in FIG. 9C). When the key 9 is drawn out, there will be no gap left except at the locking hole 63, so that the lock mechanism is hidden in the locking hole 63 and no tool can be used to open it beside the key 9. There is one thing worth mentioning, when the key 9 turns the bolt 71 to a dead point in the fixing screw hole 52, in order to aid in getting the key 9 off the locking hole 63, a plurality of releasing holes 64, 65, 66 are provided on the periphery of the locking hole 63 (as shown in FIGS. 9D to 9F). If the key 9 turns the bolt 71 to the dead point in the fixing screw hole 52 while an aligning member 91 on the key 9 is exactly aligned with the releasing hole 64 as is shown in FIG. 9D, the key 9 can be taken off directly; if the key 9 turns the bolt 71 to the dead point in the fixing screw hole 52 (as shown in FIG. 9E), while the aligning member 91 on the key 9 is between releasing holes 64 and 66 as is shown in FIG. 9D, the key 9 can be turned back along the direction shown by the arrow in the drawing to releasing hole 66 in order to be taken off the locking hole 63 as is shown in FIG. 9F.

The invention is to be construed as including all modifications and variations falling within the spirit and scope of the appended claims.

I claim:

1. A lock device for an automatic shift lever of a car comprising:

a control link extending within a knob provided on a top of an automatic shift lever, said control link including a first end protruding from a lateral side of said knob that forms a push button, said push button having an external diameter that is larger than an adjacent portion of said control link such that said push button defines a protruding portion, said control link being formed with a groove at a position spaced from said protruding portion, said groove including a first bevelling surface and a fixing member on one side thereof opposite to said first bevelling surface;

a shift control rod extending within said knob, said shift control rod being provided at a top end thereof with a sliding block that is received in said groove, said sliding block being formed with a second bevelling surface that is arranged juxtaposed to said first bevelling surface and is inclined at an angle equal to that of said first bevelling surface, said sliding block further including a limiting groove which receives said fixing member before operation of said control link; and a stop piece selectively rotatably mounted within said knob between at least a first, release position wherein said stop member permits said control link to be shifted within said knob through manual force applied to said push button which causes said fixing member to be released from said limiting groove, said second bevelling surface to slide along said first bevelling surface and said shift control rod to move downward to establish a shiftable state and a second, locking position wherein said stop member abuts said control link to prevent shifting of said control link within said knob.

2. A lock device as claimed in claim 1, wherein said stop piece is adapted to abut a second end of said control link, remote from said push button.

3. A lock device as claimed in claim 1, wherein said stop piece is adapted to abut said control link at said protruding portion.

4. A lock device as claimed in claim 1, further comprising:

a hollow sleeve provided at a bottom portion of said sliding block, said hollow sleeve including a central hole in a lower part thereof; and an axle provided atop said shift control rod, said axle having an enlarged upper portion received within the central hole of said hollow sleeve.

5. A lock device as claimed in claim 1, further comprising a protecting sleeve extending down from said knob, said protecting sleeve having two limiting members connected thereto with said limiting member extending below said protecting sleeve and into a space between a guiding plate for said shift lever and a shift lever supporting frame disposed adjacent said guiding plate.

6. A lock device as claimed in claim 5, further comprising a fixing mechanism for securing said knob and said shift lever, said fixing mechanism including a lock body non-rotatably mounted in a limiting hole formed in said knob and a lock latch including a shiftable bolt, said protecting sleeve being formed with a hole that is adapted to selectively receive said shiftable bolt to fix said knob and said shift lever.

7. A lock device as claimed in claim 6, wherein said shiftable bolt is externally threaded and the hole formed in said protecting sleeve is internally threaded wherein said shiftable bolt is adapted to be threadably received in the hole formed in said protecting sleeve.

8. A lock device as claimed in claim 7, wherein said shiftable bolt is threadably connected to said lock body.

* * * * *